United States Patent [19]
Olson

[11] Patent Number: 5,160,394
[45] Date of Patent: Nov. 3, 1992

[54] METHOD FOR TIRE SIDEWALL REPAIR

[76] Inventor: John C. Olson, 3315 S. Vandecar Rd., Mt. Pleasant, Mich. 48858

[21] Appl. No.: 638,091

[22] Filed: Jan. 7, 1991

[51] Int. Cl.$^5$ .............................................. B29C 73/00
[52] U.S. Cl. ...................................... 156/97; 152/370
[58] Field of Search ................... 156/97, 95, 98, 228; 152/367, 370, 371; 264/36; 425/11, 17, 26, 45, 51, 52, 53

[56] References Cited

U.S. PATENT DOCUMENTS

| | | |
|---|---|---|
| 1,377,098 | 5/1921 | Seymour . |
| 1,409,601 | 3/1922 | Spink . |
| 2,061,851 | 9/1935 | Saferite ........................... 152/26 |
| 2,421,096 | 5/1947 | Vogt ............................ 156/97 X |
| 2,486,669 | 11/1949 | Nassimbene ..................... 154/55 |
| 3,190,338 | 6/1965 | Wolfe ............................ 152/370 |
| 3,996,085 | 12/1976 | Barnes ........................... 156/97 |
| 4,285,382 | 8/1981 | DiRocco ........................ 152/367 |
| 4,375,231 | 3/1983 | Bubik ............................ 152/370 |
| 4,877,469 | 10/1989 | Szyms et al. .................. 425/52 X |

FOREIGN PATENT DOCUMENTS 556598 10/1943 United Kingdom .................. 156/97

*Primary Examiner*—Geoffrey L. Knable
*Attorney, Agent, or Firm*—Basile and Hanlon

[57] ABSTRACT

The invention comprises a method and apparatus for repairing a ruptured sidewall in a truck tire which eliminates bulging. The method includes the inventive step of removing the sidewall reinforcement pad from the interior of the repair area after curing the tire. The apparatus used to perform this operation comprises a sidewall reinforcement pad having a metal layer disposed between two layers of rubber. In one preferred embodiment, the metal layer is comprised of longitudinally disposed metal cords. The metal cords give additional strength to the section repair patch and prevent bulging of the ruptured repair area during the curing process.

6 Claims, 1 Drawing Sheet

METHOD FOR TIRE SIDEWALL REPAIR

BACKGROUND OF THE INVENTION

I. Field of the Invention

The present invention relates generally to a method and apparatus for repairing a ruptured tire. More particularly, the present invention relates to a method for repairing a rupture in a radial tire's sidewall by using a removable reinforcement pad having a composite construction including a layer of metal material.

II. Description of the Prior Art

Previously known sidewall repairs on steel radial truck tires, automobile tires, earth moving or farm vehicle tires have been tested to be extremely safe. Unfortunately, they appear unsafe when viewed by weigh station inspectors or state police inspectors as the repair method creates a bulge in the sidewall of the tire. This bulge creates the illusion that a separation in the sidewall exists. Although this problem is merely one of appearance and not safety, it may be hard to convince the public of this. As a result, uninformed personnel at weigh stations or highway patrol may require truckers to remove repaired radial tires as they look unsafe for road travel.

The method for repairing a rupture in a radial sidewall requires a repairman to properly skive out the injury and fill the hole resulting from the rupture with uncured rubber. A section repair patch, formed usually of a composite structure of cured and uncured rubber, is laid behind the hole. A tube and flap are then placed in the tire and the tire is mounted on a rim. An envelope is placed over the tire and the whole assembly is placed in a curing chamber.

The tire is pressurized to 115 psi and the curing chamber is heated to 250° F. When the chamber reaches 250° F., the uncured rubber in the ruptured hole begins to flow and the section repair patch behind the hole becomes pliable. With the difference in pressure between the tire and the chamber, the tire tube tends to push the section patch through the hole in the ruptured area. This creates a bulge in the repair area during the curing process. This bulge becomes a permanent part of the sidewall repair as it is permanently cured in this position.

Attempts have been made to create a stronger section repair patch to overcome the pressure differential. Section repair patches have previously been made with fibrous cords of material, such as nylon cording, to prevent bulging. Other methods of patching sidewall ruptures include clamping the repair area between a C-clamp to prevent the pressure differential from forcing the section repair through the ruptured area.

Another method developed to prevent bulging is described in U.S. Pat. No. 4,375,231 to Bubik et al. This method requires forcing the section repair patch into the ruptured area prior to the curing process. This requires an extra step in the repair process and the application of different pressures to force the section repair patch through the ruptured area depending on the tire to be repaired.

A disadvantage of these previous methods is that a bulge may still occur in the sidewall of the tire during the curing process. Previous repair methods use section repair patches formed of multiple layers of nylon, polyester or rayon. Although such section repair patches successfully reinforce the tire injury area, the existing pressure differential tends to push the patch through the hole, causing bulging. Further, steady pressure on the repaired area during use of the tire causes the patch to stretch and separate.

A still further disadvantage of these previous methods of repair is the multiplicity of steps required to prevent the bulge in the sidewall of the tire. The repair no longer becomes a simple procedure, but requires the precise measurement of pressure within the curing chamber. Other methods require the use of additional tools, such as a C-clamp, to prevent bulging.

A still further disadvantage is that the section repairs described above become a permanent part of the tire and are, therefore, not removable after the curing operation. This creates additional costs as none of the material is reusable.

SUMMARY OF THE INVENTION

The present invention provides a method for repairing a sidewall rupture using a reinforcement or support pad in conjunction with a section repair patch which overcomes the disadvantages of the previously known methods and section repairs.

The invention relates to a radial sidewall repair method comprising a section repair patch reinforced during the curing process by a support pad. In a first preferred embodiment, the support pad is formed of a composite construction including a layer of metal material.

In a second preferred embodiment of the invention, the reinforcement patch is formed of a composite construction having an upper layer of uncured rubber. This support pad is permanently cured with the section repair t the inside of the tire. However, no bulging occurs during the curing process as the support pad includes a layer of metal material.

The method of repairing a ruptured area in the tire is substantially similar to the method described above. However, the advantage of the first preferred section repair is that the support pad is removable from the tire after the curing process. Therefore, the support pad may be reused continuously on other sidewall repair areas. The support pad is formed of three layers, a rubber layer on the top and bottom and a metal layer disposed in between. The pad is then cured prior to repairing the tire. The curing of the pad creates a strong but flexible reinforcement for the repair section.

The method of repair comprises the steps of preparing the ruptured area for patching. This includes cutting a clean hole in the tire sidewall. The hole is then filled with a plug of uncured rubber and a section repair patch is placed beneath the plug on the interior of the tire. A support pad formed of metal, such as steel mesh, and cured rubber is laid behind the section repair patch.

A tube is then placed in the tire and the tire is mounted on a rim. An envelope is then placed over the tire and the whole assembly is placed in a curing chamber. The tire is pressurized to approximately 115 psi. The chamber is heated to 250° F. and the pressure in the chamber is approximately 80 psi.

The reinforcement pad is elongated and folds along the interior of the tire about the tire tube. The tube holds the cured reinforcement pad in place during the curing process. Although a pressure differential still exists between the tire and the curing chamber, the cured support pad with the metal layer is strong enough to withhold the pressure differential. The strength of the support pad prevents the section repair patch from pushing through the hole during the curing process. Therefore, no bulge is created in the repair area.

After the repair is cured, the support pad may be removed from the inside of the tire. This may be accomplished because the support pad was previously cured prior to curing the ruptured area. Therefore, the support pad does not attach itself to the interior of the tire or the section repair patch during the curing process.

The second preferred embodiment of the support pad comprises a top and bottom layer of rubber having a metal layer, preferably formed of longitudinally disposed metal cording therebetween. After curing the support pad, a layer of uncured rubber is deposited on top of the upper cured layer of rubber. The support pad can then be used as the actual section repair patch while simultaneously preventing any bulging in the repair area.

The method of repairing a ruptured tire is similar to that described above. However, the uncured layer of rubber on the support pad permanently cures the pad to the interior of the tire. Therefore, the support pad is not removable after the curing process. The section repair is, however, stronger than any previously known section repairs as it comprises a metal layer of material disposed between the now fully cured rubber layers.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiments of the present invention when read in conjunction with the accompanying drawing, in which like reference characters refer to like parts throughout the views, and in which.

DESCRIPTION OF THE PREFERRED EMBODIMENTS

Figure 1:
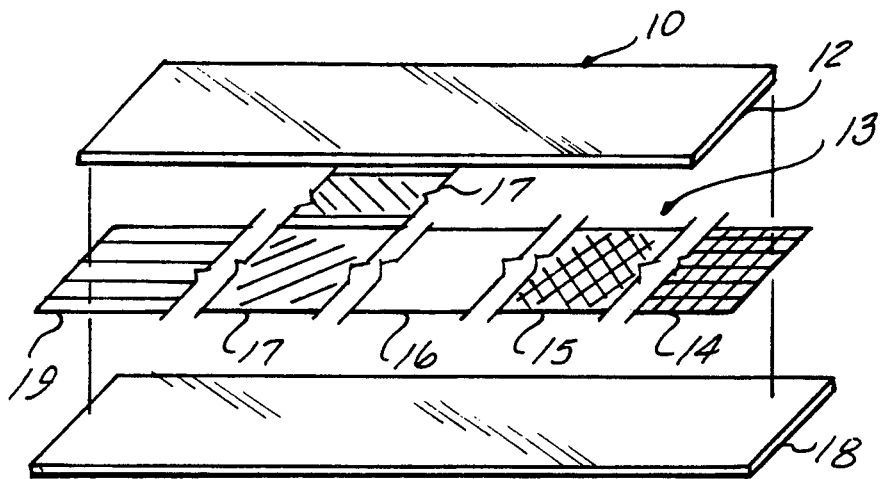
FIG. 1 is an exploded view showing a first preferred embodiment of the support pad.

Referring to FIG. 1, a first preferred embodiment of a support pad is there shown at 10. An upper layer of rubber 12 and a lower layer of rubber 18 are disposed about a metal layer 13. The rubber layers 12, 18 are preferably formed of Synthetic Black Rubber (SBR), produced by Ameripol Synpol, Inc, Akron, Ohio, mixed with #3007 Accelerator, produced by Production Systems, Inc., Akron, Ohio. A second preferred rubber embodiment may be formed from Chlorobutyl Heat Resistant Compound comprising Accelerator and produced by Production Systems, Inc. of Akron, Ohio. The metal layer 13 is preferably formed of longitudinally and traversely disposed metal cords 14. The steel mesh cording 14 provides support both longitudinally and laterally along the support pad 10. The mesh 14 is shown traversing along a horizontal and vertical axis but may also be disposed along a bias 15. The support pad 10 is cured and forms a rubber reinforcement or support pad having an inner layer of metal material.

The metal layer 13 may also be comprised of solid sheet metal 16 or formed of the tire belting material itself. Such tire belting may comprise two-ply biased belting with each belt laying along an opposite bias 17 or single-ply, non-biased belting 19.

Figure 2:
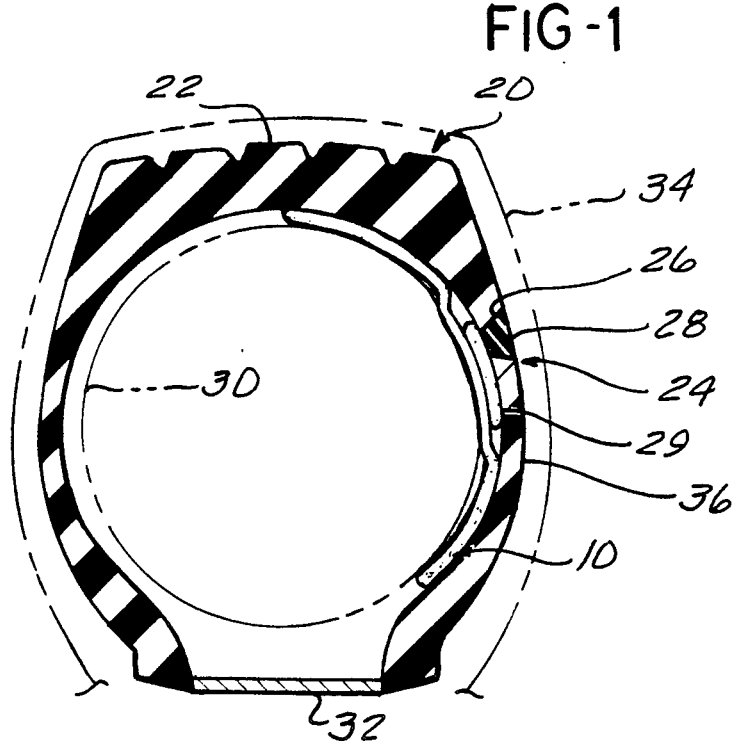
FIG. 2 is a cut-away side view showing the preferred method of repair according to the present invention.

With reference now to FIG. 2, a preferred method of repairing a ruptured area in a tire is there shown at 20. A tire 22 having a ruptured area 24 is prepared for repair by creating a cleanly cut hole 26.

A plug of uncured rubber 28, preferably formed from low temperature cure cushion gum, is placed in the hole 26. A section repair patch 29 is placed beneath the plug 28 on the interior of the tire 20. Cured support pad 10 is placed behind the section repair patch 29 and is supported in place by a tire tube 30 (shown in phantom).

The tire 22 is mounted on a rim 32. An envelope 34 is placed about the tire 22 and the whole assembly is placed in a curing chamber (not shown). The tire is pressurized to 115 psi and a vacuum is applied to the envelope 34, forcing the envelope against the tire 22. The curing chamber is preferably heated to 250° F. and pressurized to 80 psi. The temperature of the curing chamber may range from 211° F.-300° F. When the tire 22 reaches 250° F., the plug 28 begins to flow. The support pad 10, however, does not react similarly to the heat as it has been previously cured.

The pressure differential in the chamber and the tire 22 forces the section repair patch 29 into the hole 26, resulting in a normally bulging plug 28. The support pad 10, comprised of metal layer 13 strengthens the section repair 10 and prevents the section repair patch 29 from pushing through hole 26 in reaction to the pressure differential. Therefore, plug 28 and the section repair patch 29 do not bulge outwardly as the support pad 10 sustains the force of the pressure rather than the patch 29 and plug 28. The plug 28 is fully cured in an unexpanded position creating a smooth sidewall 36.

After the curing process, the support pad 10 is removable from the inside of the tire 22 and can be reused continuously for other sidewall repairs.

Figure 3:
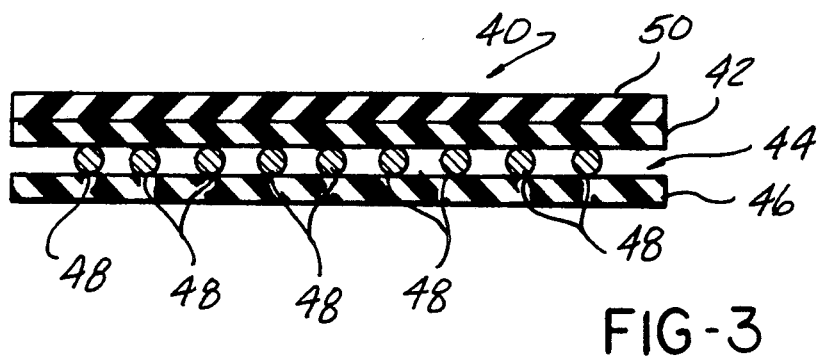
FIG. 3 is a side sectional view showing a second preferred embodiment of a support pad according to the present invention.

With reference now to FIG. 3, a second preferred embodiment of a support pad 40 is there shown. An upper layer of rubber 42 and a lower layer of rubber 46 are disposed about a metal layer 44. The metal layer 44 is preferably comprised of longitudinally disposed metal cords 48. After the support pad 40 is cured, an uncured layer of rubber 50 is deposited on the upper layer of cured rubber 42.

The preferred method of repairing a tire with the support pad 40 is as described above. However, the support pad 40 acts as its own section repair patch and is permanently disposed within the tire 22. This is accomplished during the curing process of the plug 28 as the uncured layer of rubber 50 is cured to the plug 28 and the interior of the tire 22. Thus, the support pad 40 eliminates providing a separate section repair patch.

It should be understood that the rubber layers 42, 46 are preferably formed of Synthetic Black Rubber mixed with accelerator or Chlorobutyl Heat Resistant compound with accelerator as described above.

The above support pad prevents bulging in the sidewall of the tire due to the interdisposed metal layer. Further, the first preferred embodiment of the reinforcement patch is removable and, therefore, reusable. This creates an inexpensive section repair method.

Having described my invention, however, many modifications thereto will become apparent to those skilled in the art to which it pertains without deviation from the spirit of the invention as defined by the scope of the appended claims.

I claim:

1. A process for repairing a ruptured area in a tire having a sidewall with an interior surface, the repair process comprising the steps of:
   preparing the area to be patched by cutting an opening in the tire sidewall surrounding the ruptured area such that the opening has essentially uniform surface edges;
   placing a plug of uncured rubber within the prepared area;
   laying a section repair patch against the interior surface of the sidewall such that the patch covers the plug;
   positioning a reinforcement pad against the interior surface of the sidewall such that the pad covers the section repair patch;
   inflating a tube placed within the tire;
   placing the tire with a curing chamber and curing the rubber plug within the patch area, the reinforcement pad being capable of withstanding a pressure differential which exists between the tire and the curing chamber, such that the section repair patch is prevented from pushing through the opening in the ruptured area, thereby preventing an undesirable bulge in the tire sidewall; and
   removing the reinforcement pad from the sidewall interior surface after repairing the tire.

2. The method of claim 1 wherein said reinforcement pad comprises a composite construction including a layer of metal material.

3. The method of claim 2 wherein said metal layer comprises a solid sheet of metal.

4. The method of claim 2 wherein said metal layer comprises single-ply non-biased metal cords.

5. The method of claim 2 wherein said metal layer comprises criss-crossing metal cords.

6. The method of claim 2, said metal layer comprising two-ply biased metal cords, wherein one of said two-ply biased cords is disposed at an angle perpendicular to an angle at which the other of said biased cords is disposed.

* * * * *